US008360861B2

(12) United States Patent
McKay et al.

(10) Patent No.: US 8,360,861 B2

(45) Date of Patent: Jan. 29, 2013

(54) GAMING SYSTEM AND A METHOD OF GAMING

(75) Inventors: Linn Anthony McKay, Henderson, NV (US); Jay Stone, Las Vegas, NV (US)

(73) Assignee: Aristocrat Technologies Australia Pty Limited (AU)

( * ) Notice: Subject to any disclaimer, the term of this patent is extended or adjusted under 35 U.S.C. 154(b) by 639 days.

(21) Appl. No.: 12/324,524

(22) Filed: Nov. 26, 2008

(65) Prior Publication Data

US 2009/0264179 A1 Oct. 22, 2009

Related U.S. Application Data

(60) Provisional application No. 60/990,874, filed on Nov. 28, 2007.

(51) Int. Cl.
*A63F 9/24* (2006.01)
*A63F 17/00* (2006.01)
*G06F 13/00* (2006.01)
*G06F 19/00* (2011.01)

(52) U.S. Cl. ................................ 463/25; 463/17; 463/20

(58) Field of Classification Search .................... 463/16, 463/20, 1, 17, 25

See application file for complete search history.

(56) References Cited

U.S. PATENT DOCUMENTS 5,839,957 A 11/1998 Schneider et al.
5,879,234 A 3/1999 Mengual
5,938,196 A 8/1999 Antoja
7,419,428 B2 * 9/2008 Rowe .............................. 463/25
2004/0077401 A1 4/2004 Schlottmann
2004/0077402 A1 4/2004 Schlottmann
2004/0209667 A1 10/2004 Emori
2005/0075156 A1 * 4/2005 Seelig et al. ...................... 463/1
2006/0052152 A1 3/2006 Tedsen
2006/0068886 A1 3/2006 Takano
2006/0094511 A1 5/2006 Roireau
2007/0054727 A1 3/2007 Garamendi
2007/0105610 A1 5/2007 Anderson
2007/0117605 A1 5/2007 Ghaly
2009/0227337 A1 * 9/2009 Langille et al. ................. 463/20
2010/0160016 A1 * 6/2010 Shimabukuro et al. ......... 463/16

FOREIGN PATENT DOCUMENTS

CA 2072701 2/1993
EP 0065404 11/1982
EP 1515283 3/2005
EP 1571623 9/2005
EP 1752940 2/2007
GB 2112984 7/1983
GB 2399444 9/2004
GB 2419998 5/2006
JP 2005046548 2/2005
JP 2005046549 2/2005
JP 2005046550 2/2005
WO 2006028860 3/2006
WO 2006039324 4/2006
WO 2007032878 3/2007
WO 2007055949 5/2007

* cited by examiner

*Primary Examiner* — Ronald Laneau
*Assistant Examiner* — Wilner Jean Baptiste
(74) *Attorney, Agent, or Firm* — McAndrews, Held & Malloy, Ltd.

(57) ABSTRACT

A method of gaming comprising: generating a game outcome by selecting a plurality of symbols, and displaying the selected symbols on a display at respective ones of a plurality of display positions arranged in a three-dimensional array; and determining whether the game outcome includes one or more winning outcomes.

46 Claims, 11 Drawing Sheets

GAMING SYSTEM AND A METHOD OF GAMING

RELATED APPLICATIONS

This application is derived from and, claims benefit of, U.S. provisional application 60/990,874 filed 28 Nov. 2007, the disclosure of which is incorporated herein by reference.

FEDERALLY SPONSORED RESEARCH OR DEVELOPMENT

[Not Applicable]

MICROFICHE/COPYRIGHT REFERENCE

[Not Applicable]

FIELD OF THE INVENTION

The present invention relates to a gaming system, a method of gaming, a game controller and computer program code.

BACKGROUND OF THE INVENTION

It is known to provide a gaming system such as a video slot machine wherein symbols are displayed as a plurality of virtual reels on a video display. Each reel comprises a plurality of symbols arranged in a predetermined sequence. Typically, when a reel stops, a plurality of symbols of each reel are visible on the display. For example, three symbols of each reel. While the stopping position of the reel can be chosen in a number of different ways, in all cases, the symbols which stop in the display define a 2-dimensional display array having a width x defined by the number of reels and a height y defined by the number of symbols of the reel that are displayed. For example, in a three reel slot machine, the displayed array would have a width x of three symbols (one for each reel) and a height y of three symbols defining a 3×3 two-dimensional array of nine symbols. As is known in the art "symbols" can include images, numbers, e.g. a "7", letters or can be "blanks" (no image, number or letter).

The array also provides symbol arrangements which can be defined by pay lines. Historically only one pay line was used which was the horizontal centerline through the array. Later, three pay lines were used defined by the three horizontal line through the array. Modernly more pay lines such as diagonals and reflecting lines through the array have been used. Players wager upon pay lines and when an outcome arranged along a wagered upon pay line corresponds to a predetermined winning symbol arrangement such as, for example, three 7s, the player is issued an award.

While such gaming systems provide users with enjoyment, a need exists for alternative gaming systems in order to maintain or increase player enjoyment.

SUMMARY OF THE INVENTION

In a first aspect, the invention provides a method of gaming comprising:

- generating a game outcome by selecting a plurality of symbols, and displaying the selected symbols on a display at respective ones of a plurality of display positions arranged in a three-dimensional array; and
- determining whether the game outcome includes one or more winning outcomes.

In an embodiment, the method comprises receiving a player selection defining a player win entitlement and wherein determining whether the game outcome includes a winning outcome is based on the player win entitlement.

In an embodiment, the player selection is made by selecting at least one of a plurality of pay lines, each pay line comprising a different set of the plurality of display positions, and wherein determining whether there is one or more winning outcome comprises determining whether to make an award based on each player selected pay line and the selected symbols.

In an embodiment, the plurality of pay lines include pay lines in respective ones of a plurality of different parallel planes.

In an embodiment, at least two of the plurality of pay lines are in respective ones of a pair of transverse planes.

In an embodiment, the number of symbol positions is the same along at least two axes of the three-dimensional array.

In an embodiment, the number of symbol positions is the same along all three axes of the three-dimensional array.

In an embodiment, the number of symbol positions is the different along the third axis of the three-dimensional array.

In an embodiment, the three-dimensional array is a 3×3×3 array.

In an embodiment, the three-dimensional array is a 4×4×4 array.

In an embodiment, the three-dimensional array is a 5×3×3 array.

In an embodiment, selecting the symbols comprises randomly selecting stop positions for a plurality of reels.

In an embodiment, the number of the plurality of reels corresponds to the number of symbol positions in a plane parallel to two axes of the three-dimensional array.

In an embodiment, each symbol is displayed as three-dimensional on the display.

In an embodiment, the steps of generating a game outcome and determining whether the game outcome includes one or more winning outcomes are performed by a game controller.

In a second aspect, the invention provides a game controller for a gaming system, the game controller arranged to:

- generate a game outcome by selecting a plurality of symbols, and displaying the selected symbols on a display at respective ones of a plurality of display positions arranged in a three-dimensional array; and
- determine whether the game outcome includes one or more winning outcomes.

In an embodiment, the game controller is arranged to receive a player selection defining a player win entitlement and wherein determining whether the game outcome includes a winning outcome is based on the player win entitlement.

In an embodiment, the player selection comprises at least one of a plurality of pay lines, each pay line comprising a different set of the plurality of display positions, and wherein the game controller determines whether there is one or more winning outcome by determining whether to male an award based on each player selected pay line and the selected symbols.

In an embodiment, the plurality of pay lines include pay lines in respective ones of a plurality of different parallel planes.

In an embodiment, at least two of the plurality of pay lines are in respective ones of a pair of transverse planes.

In an embodiment, the number of symbol positions is the same along at least two axes of the three-dimensional array.

In an embodiment, the number of symbol positions is the same along all three axes of the three-dimensional array.

In an embodiment, the number of symbol positions is the different along the third axis of the three-dimensional array.

In an embodiment, the three-dimensional array is a 3×3×3 array.

In an embodiment, the three-dimensional array is a 4×4×4 array.

In an embodiment, the three-dimensional array is a 5×3×3 array.

In an embodiment, the game controller selects the symbols by randomly selecting stop positions for a plurality of reels.

In an embodiment, the number of the plurality of reels corresponds to the number of symbol positions in a plane parallel to two axes of the three-dimensional array.

In an embodiment, the game controller is implemented by a processor executing program code stored in a memory.

In a third aspect, the invention provides a gaming system comprising:

- a player interface comprising a video display and game instruction input mechanism operable by a player to make a player selection specifying a win entitlement; and
- a game controller arranged to:
  - generate a game outcome by selecting a plurality of symbols, and displaying the selected symbols on a display at respective ones of a plurality of display positions arranged in a three-dimensional array; and
- determine whether the game outcome includes one or more winning outcomes.

In an embodiment, the gaming system comprises a memory and a processor arranged to execute game program code stored in the memory to implement the game controller.

In an embodiment, the memory stores data representing the plurality of symbols.

In an embodiment, the instruction input mechanism is operable by the player to input a wager in respect of the player selection.

In an embodiment, the instruction input mechanism is operable by the player to select at least one of a plurality of pay lines, each pay line comprising a different set of the plurality of display positions, and wherein determining whether there is one or more winning outcome comprises determining whether to make an award based on each player selected pay line and the selected symbols.

In all embodiment, the plurality of pay lines include pay lines in respective ones of a plurality of different parallel planes.

In an embodiment, at least two of the plurality of pay lines are in respective ones of a pair of transverse planes.

In an embodiment, the number of symbol positions is the same along at least two axes of the three-dimensional array.

In an embodiment, the number of symbol positions is the same along all three axes of the three-dimensional array.

In an embodiment, the number of symbol positions is the different along the third axis of the three-dimensional array.

In an embodiment, the three-dimensional array is a 3×3×3 array.

In an embodiment, the three-dimensional array is a 4×4×4 array.

In an embodiment, the three-dimensional array is a 5×3×3 array.

In an embodiment, the game controller is arranged to select the symbols comprises randomly selecting stop positions for a plurality of reels.

In an embodiment, the number of the plurality of reels corresponds to the number of symbol positions in a plane parallel to two axes of the three-dimensional array.

In an embodiment, each symbol is displayed as three-dimensional on the display.

In a fourth aspect, the invention provides computer program code which when executed implements the above method.

In a fifth aspect, the invention provides a computer readable storage medium comprising the program code.

In a sixth aspect, the invention provides transmitting the program code.

BRIEF DESCRIPTION OF THE DRAWINGS

An embodiment of the invention will now be described in relation to the following drawings in which.

DETAILED DESCRIPTION OF THE EMBODIMENT

The embodiment provides a gaming system having a game controller that implements a game where a game outcome is generated by selecting a plurality of symbols that are displayed at a plurality of display positions in a three-dimensional array. It is determined whether a game outcome includes a winning outcome corresponding to a player selection. For example, in one embodiment, a player selects pay lines to play from a plurality of pay lines. The pay lines are arranged such that at least one pay line extends through the array. Thus, there are pay lines in at least two different planes or sub-arrays.

Forms of Gaming Systems

In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Figure 1:
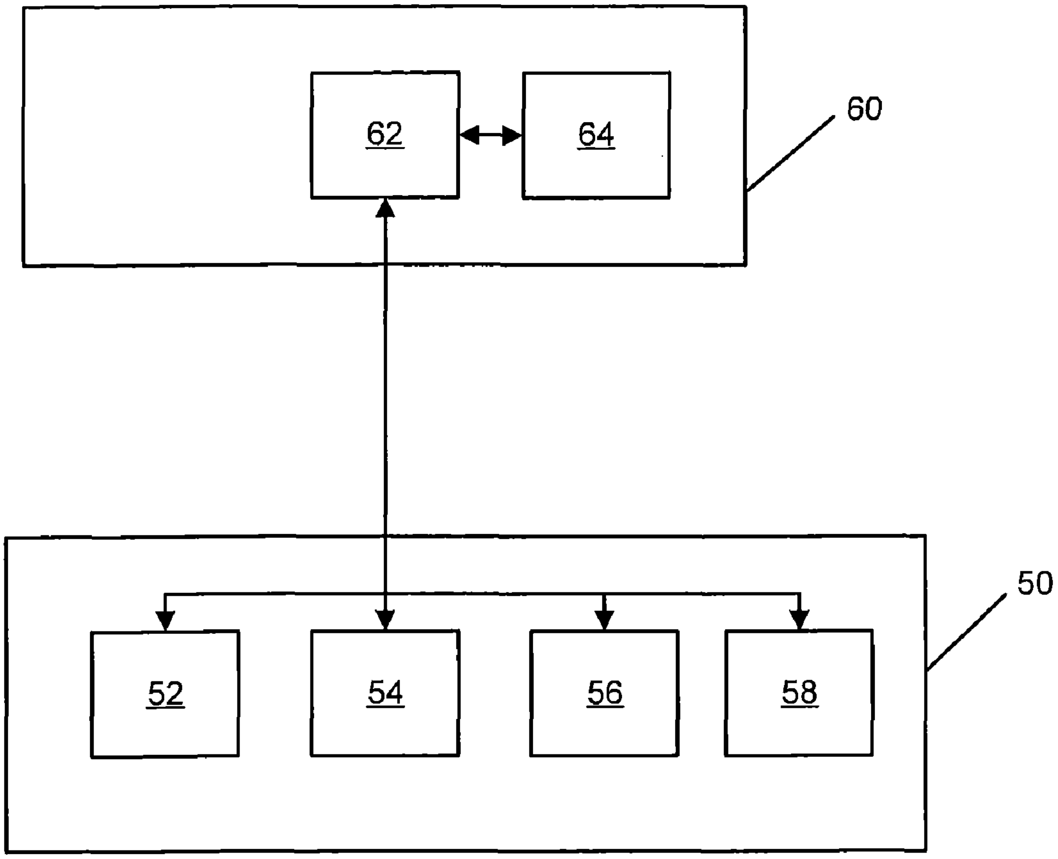
FIG. 1 is a block diagram of the core components of a gaming system.

Irrespective of the form, the gaming system comprises several core components. At the broadest level, the core components are a player interface 50 and a game controller 60 as illustrated in FIG. 1. The player interface 50 is arranged to enable interaction between a player and the gaming system and for this purpose includes the input/output components required for the player to enter instructions including selections and play the game.

Components of the player interface 50 may vary from embodiment to embodiment but will typically include a credit mechanism 52 to enable a player to input credits and receive payouts, one or more displays 54, a game play mechanism 56 that enables a player to input game play instructions, and a speaker 58 for audio outputs.

The game controller 60 is in data communication with the player interface 50 and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
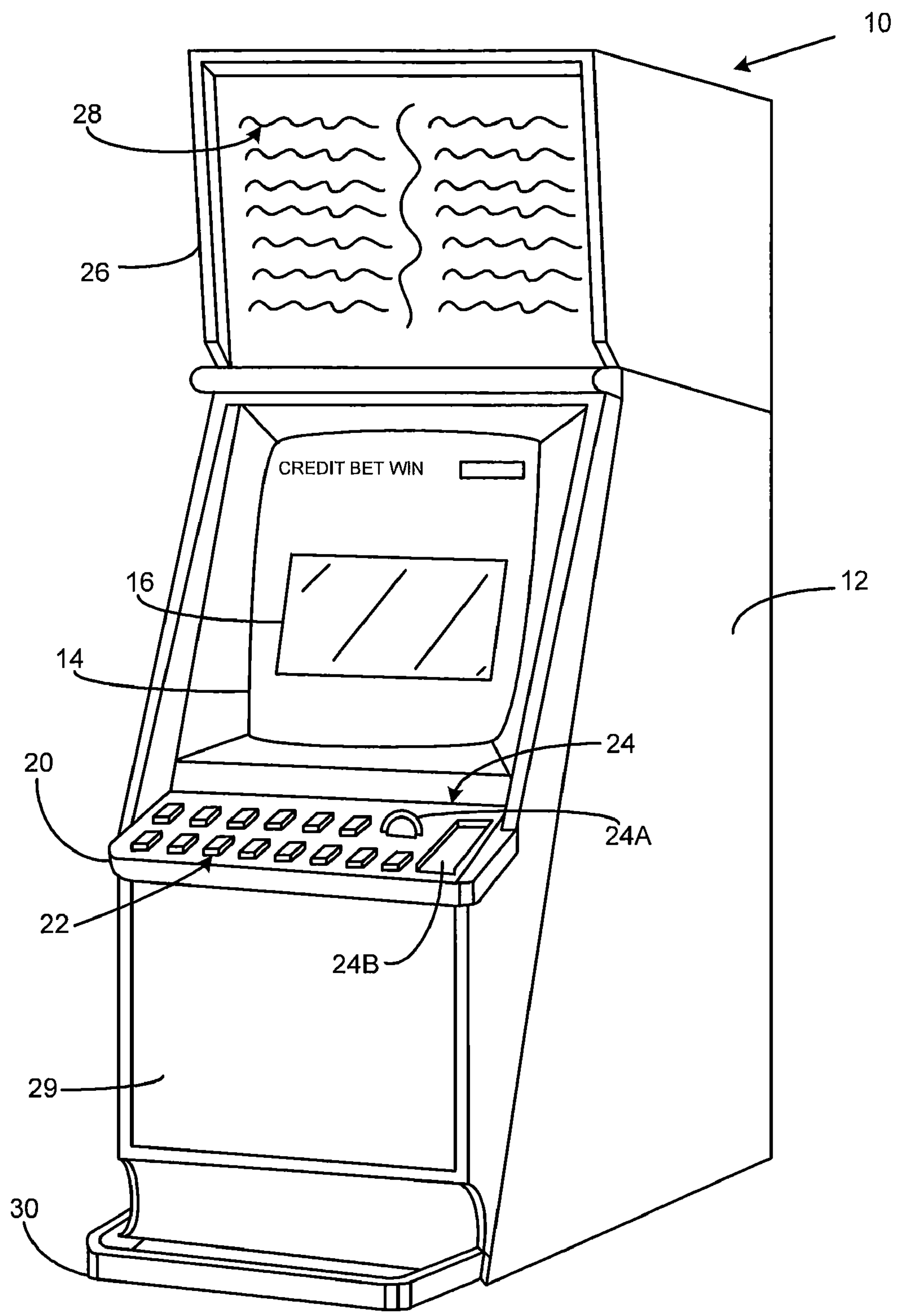
FIG. 2 is a perspective view of a gaming machine.

A gaming system in the form of a stand alone gaming machine 10 is illustrated in FIG. 2. The gaming machine 10 includes a console 12 having a video display 14 on which is displayed representations of a game 16 that can be played by a player, such as the game of the embodiment. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill validator 24B. Other credit input mechanisms may also be employed, for example, a card reader for reading a smart card, debit card or credit card or credits may be electronically downloaded from an account such as described in U.S. Pat. No. 6,511,377 the disclosure of which is hereby incorporated by reference. A player marketing module may be provided having a reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example game pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit. The top box 26 may also include a display, for example a video display unit, which may be of the same type as the display 14, or of a different type.

Figure 3:
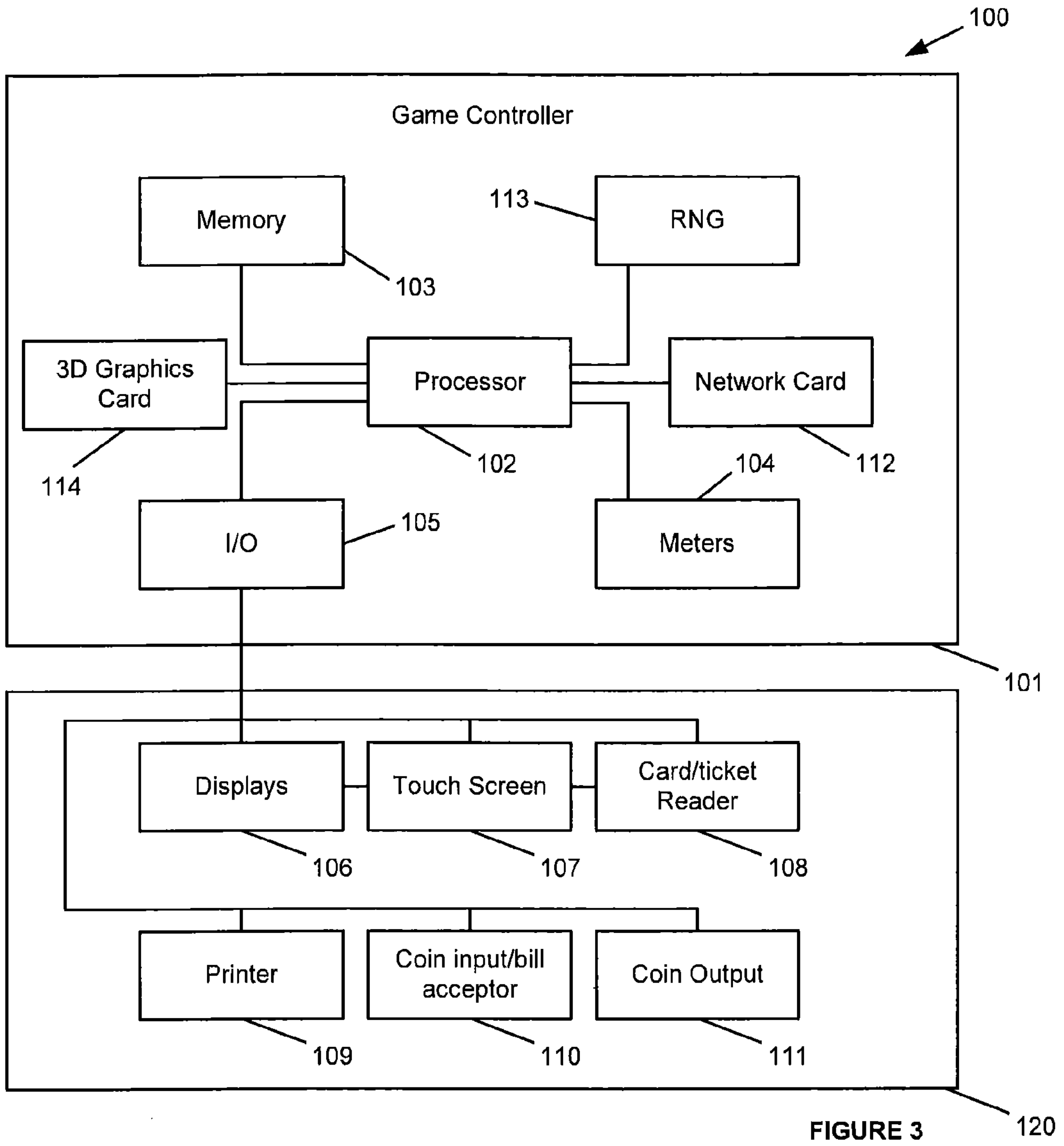
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103. Memory 103 also stores data,—for example, in a data structure—corresponding to the game symbols or indicia for the game. "Symbols" as used in this specification includes images which may be pictures, numbers, icons, letters or other indicia used for the play of the game as hereinafter described. Memory 103 may also store winning symbol arrangements and awards which are used to determine when the player obtains a winning, outcome and the award for each winning outcome.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. The random numbers selected are processed by the processor 102 with data from the memory 103 to randomly select and display the outcomes of symbols for the game as hereinafter described. In an embodiment, a 3D graphics card 114 may be used to render the depiction of the three-dimensional array on the display 14 or one or more of the provided displays 106.

In the example shown in FIG. 3, a player interface 120 includes peripheral devices that communicate with the game controller 101 comprise one or more displays 106, a touch screen 107, a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation.

In addition, the gaming machine 100 may include a communications interface, for example a network card 112. The network card may, for example, send status information, accounting information or other information to a central controller, server or database and receive data or commands from the central controller, server or database.

Figure 4:
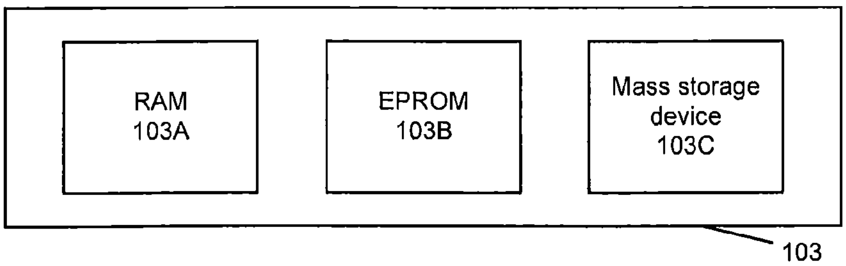
FIG. 4 is a block diagram representing the structure of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
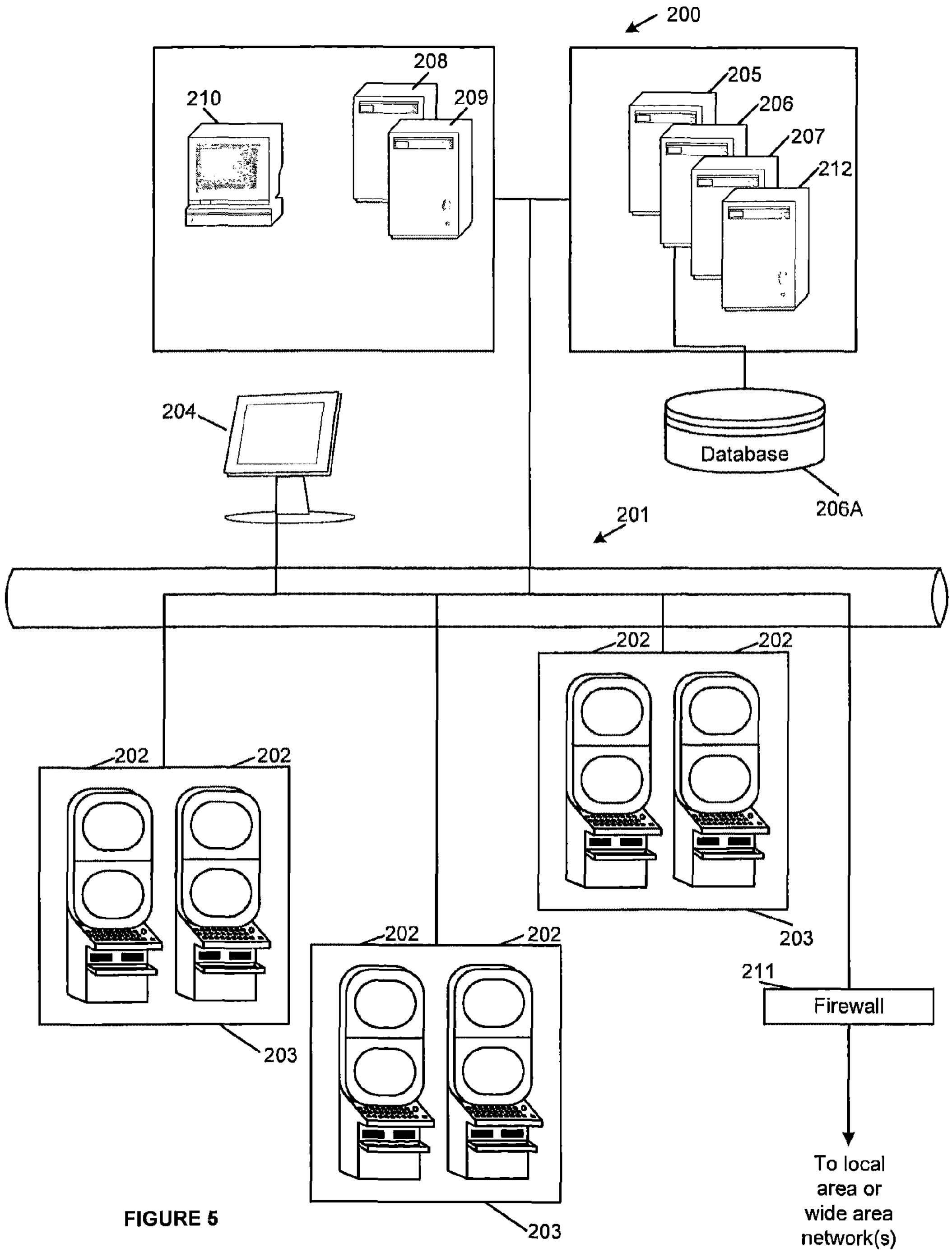
FIG. 5 is a diagram schematic of a networked gaming system.

FIG. 5 shows a gaming system 200 in accordance with an alternative embodiment. The gaming system 200 includes a network 201, which for example may be an Ethernet network.

Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to carry out the accounting in respect of the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming network 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of games servers could be provided to run different games or a single game server may run a plurality of different games as required by the terminals.

As indicated above, in the embodiment the three-dimensional array of symbols is formed by displaying selected symbols at respective ones of a plurality of symbol positions. In the embodiment, the processor 62 randomly selects the symbols and controls the display 16 to display the symbols in a three dimensional array as exemplified by FIGS. 8-10.

Figure 6:
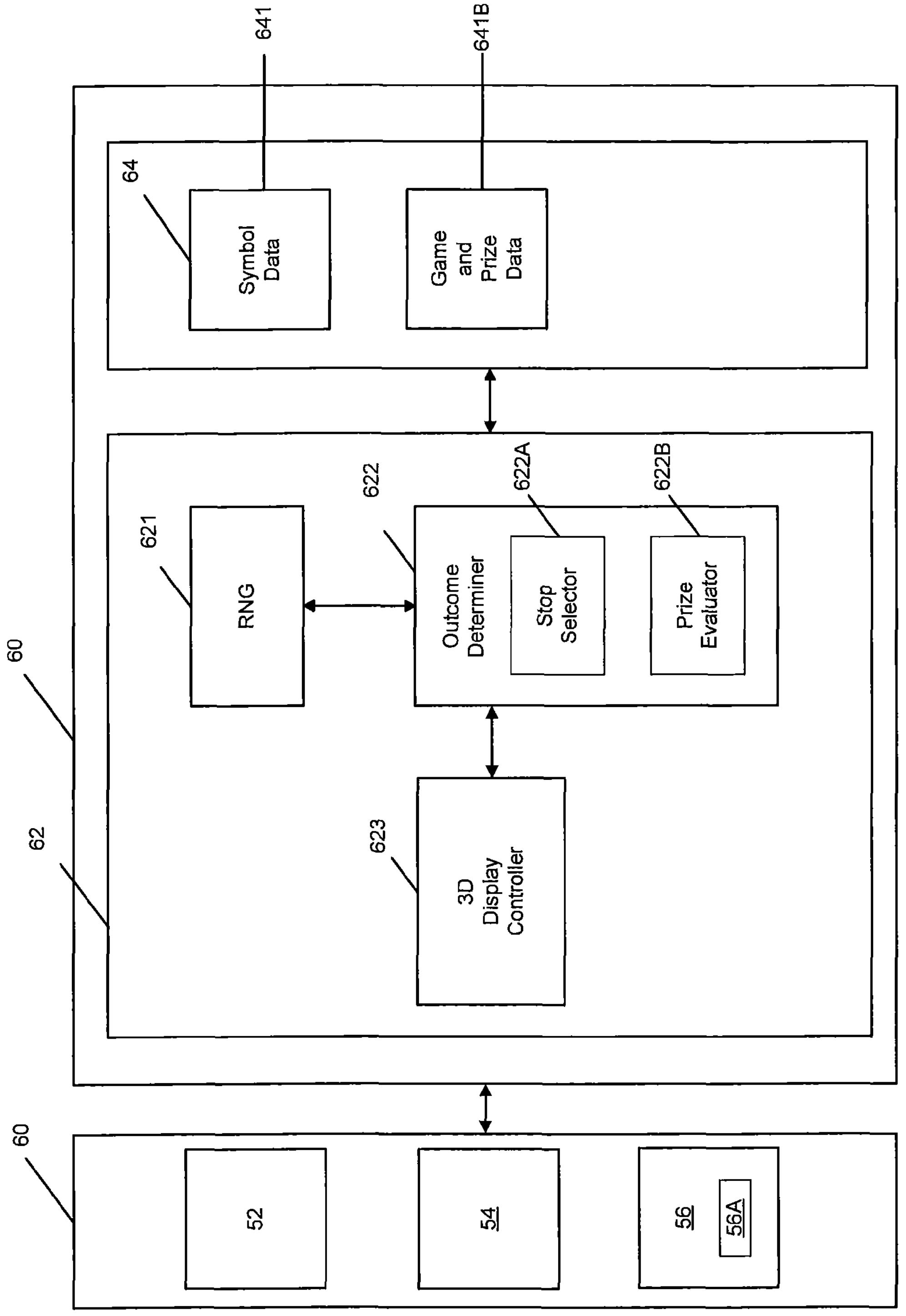
FIG. 6 is a further block diagram of the gaming system.

The game controller 60 of the embodiment is shown in more detail in FIG. 6. It will apparent that the processor 62 implements a number of modules, for example random number generator module 621 by executing software routines. Persons skilled in the art will appreciate that not all modules need be implemented by processor 62. For example, the random number generator module 621 could be implemented by a separate circuit or by a random number generator server.

The outcome determiner 622 of game controller 60 selects symbols by employing a stop selector 622A that randomly determines the stop position for each virtual reel using random numbers from random number generator 621. Data corresponding to each virtual reel is configured to represent the arrangements of symbols as they would be displayed. Symbol data 641B stored in memory 64 represents each reel and the sequence of the symbols as they would appear on a reel strip if the virtual reel were a physical reel, e.g. a "7" is above a "Blank" and below a "Cherry". For example, if there are nine reels, each having twenty symbols (sometimes referred to as stops) the random number generator and stop selector 622A might determine that a series of stop positions are positions: 3, 13, 7, 9, 1, 7, 14, 10 and 17—i.e. to particular positions in the sequence of the symbols. These are then mapped to symbols such that the selected symbols for a centre line position in the display 16 for each reel are, for example, a 7, Blank, Bar, Bar-Bar, Wild, Blank, Blank respectively the display 16 is controlled to display the selected symbols at the centre line position with the symbols from each virtual reel as mapped above and below those symbols. Each symbol or stop position may have a weighting as suggested in Telnaes, U.S. Pat. No. 4,448,419, the disclosure of which is incorporated by reference.

In an alternative embodiment the random number generator may select random numbers which result in the placement of a symbol at each position in the matrix array departing from the concept of virtual reel strips.

As in normal spinning reel games, the game controller 60 is adapted to receive an instruction from the player interface 50 from a player which enables a player to make a selection which affects the player's entitlement to win (a "win entitlement"). In one example, a players win entitlement may be based on how many pay lines they will play in each game—i.e. a minimum of one pay line up to the maximum number of pay lines allowed by the game (noting that not all permutations of win lines may be available for selection). The player operates pay line selector 56A of the instruction input mechanism 56 in order to select the number of pay lines. In many games, the players win entitlement is not strictly limited to the lines they have selected, for example, "scatter" pays are awarded independently of a player's selection of pay lines and are an inherent part of the win entitlement. The increased number of display positions provided by three dimensional arrays relative to two dimensional arrays of the same dimensions, as described herein, provides additional options in game pay lines, game design and game play.

Persons, skilled in the art, will appreciate that in other embodiments, the player may obtain a win entitlement select a number of reels to play such as described in Bennett, U.S. Pat. No. 6,063,102 titled "Multiline Gaming Device" the disclosure of which is hereby incorporated by reference. Some pay arrangements may be formed by a set of symbol positions made up of symbols from different reels making such arrangement a type of structured "scatter" pay where there are nm possible pay arrangements in a two dimensional array where n=number of rows in the array and m=number of columns (reels). This scatter pay arrangement may be used in lieu of pay lines in some embodiments; however due to the number and complexity of pay arrangements which would be defined thereby, a pay line configuration is advantageous. In other embodiments a player win entitlement may be defined by purchasing access to particular pay tables—e.g. a first bet amount entitles the player to wins including cherries and a second amount entitles them to wins including plums. The win entitlement is not always purchased—e.g. a series of free games may be awarded to a player.

The win entitlements which can be purchased are usually advertised to the player by markings on the display, for example by or diagrams showing the symbol positions that correspond to each pay line. Typically, the pay lines will be constituted by symbol positions in the visible window. A win outcome is determined based on the selected symbols of a game outcome and a player's win entitlement and a pay table that specifies awards.

Unlike conventional gaming machines, in the embodiment, the 3D display controller 623 displays symbol data in a three dimensional array which includes three sub-arrays depicted as planar, two-dimensional, 3×3 matrices of three-dimensionally rendered symbols stacked vertically one above the other as illustrated in FIGS. 8 to 10.

Figure 8A:
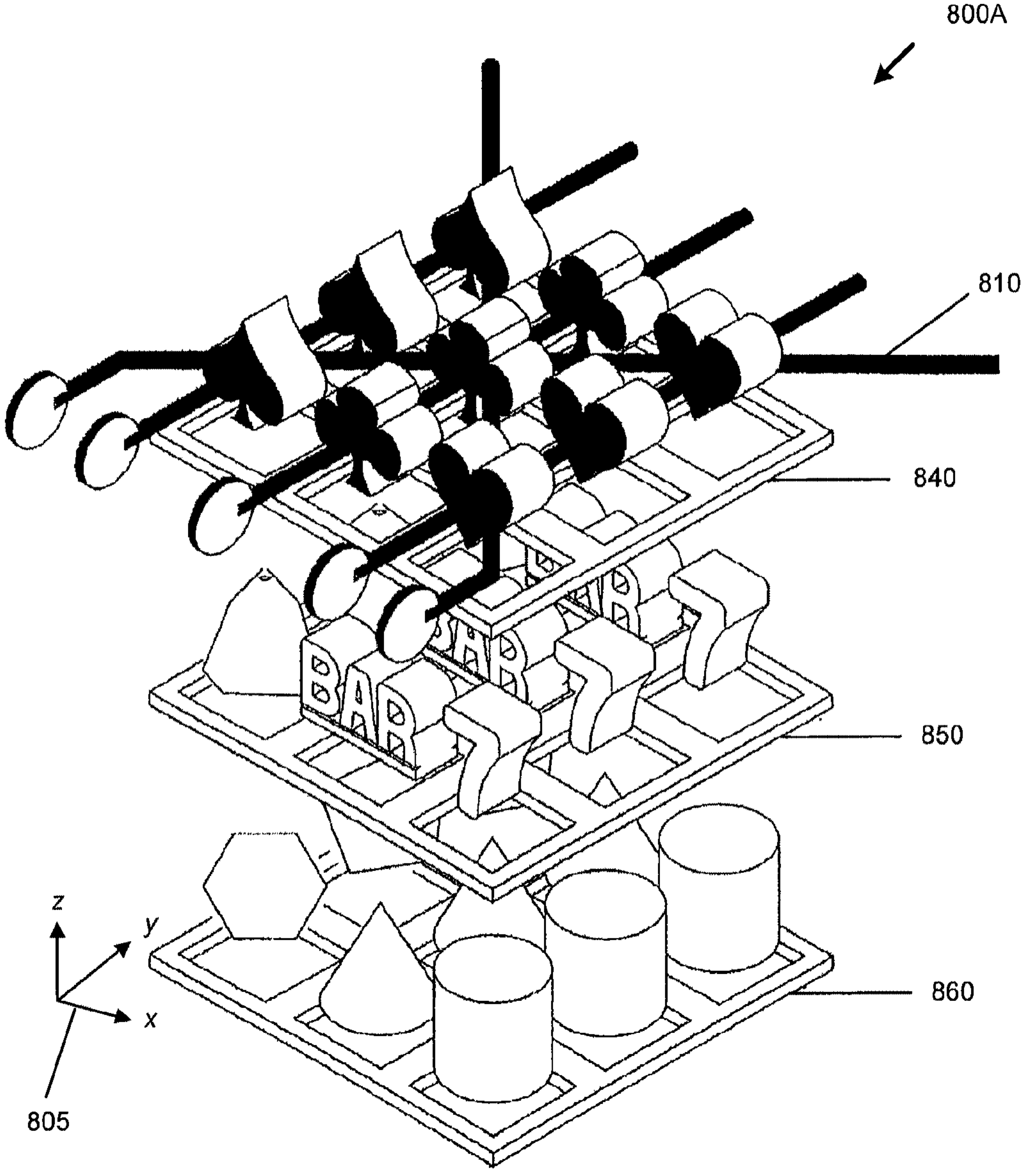
FIGS. 8A-8C show a 3×3×3 three dimensional array and the horizontal pay lines in the sub-arrays.

Starting with the example of FIG. 8A, it will apparent that the display controller is arranged to display 16, at least in the example of FIG. 8A, twenty seven different symbol positions as defined by three, 3×3, sub-arrays 840, 850 and 860. It will be apparent from the perspective view of FIG. 8A that all of these symbol positions may not be visible at one time, in particular, the symbols in the lower plane 860 are initially obscured by symbols of the middle plane 850. Persons skilled in the art will appreciate that various display techniques will be available in order to display all the symbols, including making part of the display transparent or "ghost-like" during part of the display routine or rotating the symbol display, spacing the sub-arrays 840,850 and 860 or providing an auxiliary display (e.g. on a display in the top box 26) showing each of the sub-arrays in plan view. In each of FIGS. 8 to 10, a common convention is used to designate the three axes of the three dimensional array of display positions of symbols. As indicated by reference axis 805, the two horizontal axis are designated the X and Y axis and the vertical axis is designated the Z axis.

Each sub-array 840, 850 and 860 is depicted as a 3×3 matrix of symbols as would be displayed in a familiar, virtual, 3-reel slot machine. Thus each sub-array 840, 850 and 860 presents 9 symbol positions defined by three rows of symbols for each of three reels (in the X axis). The reels for one sub-array may be rotated 90 degrees relative to an adjoining sub-array. For example, sub-array 849 may have its reels arranged rotated 90 degrees relative to the reels of sub-array 850. On the embodiment the reels for all sub-arrays 840,850, 860 are arranged to spin in the same direction.

It will also be appreciate that the 3D display controller 623 may be arranged to display the reels as spinning in the direction of the z axis. Further, other techniques may be used to display the symbols locating in the display position without displaying reels or the like. For example, it is possible to individually select the symbols for each position and individually populate each of the display positions.

Referring to FIG. 8A, it will be apparent that the three dimensional array 800A shown in FIG. 8A is displayed in a perspective view in order to maximise the number of display positions that are visible.

Figure 8B:
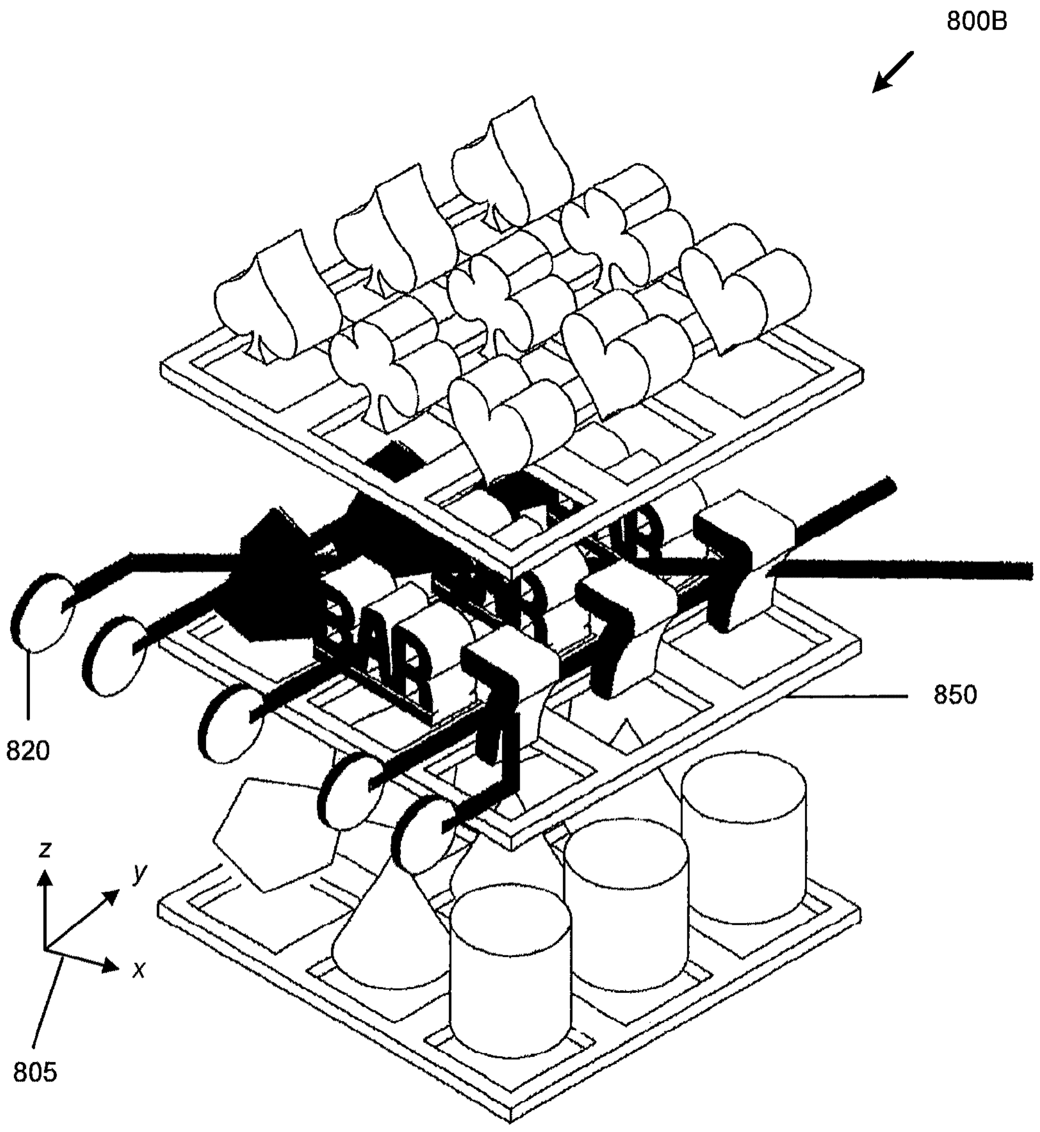
Figure 8C:
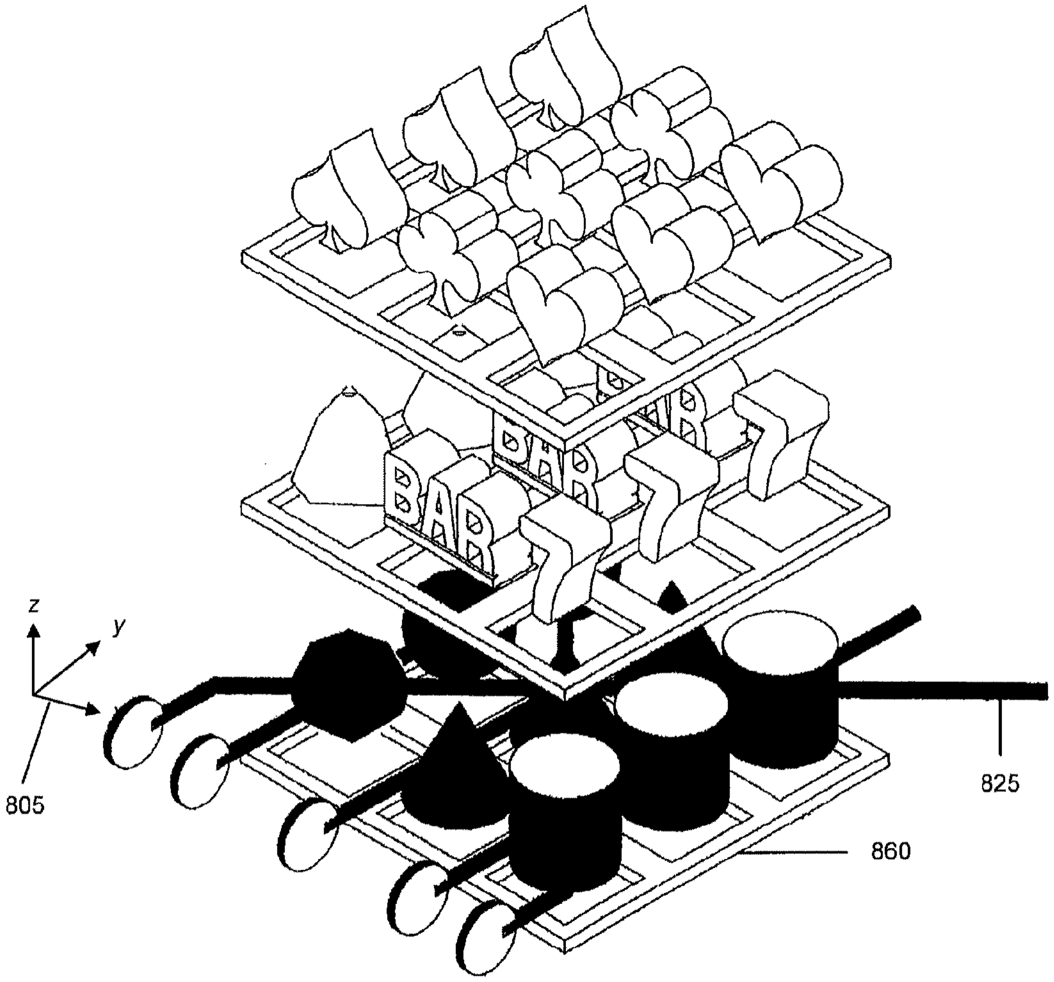

As shown in FIG. 8A each sub-array 840,850,860 includes five pay lines 820 (shown in sub-array 840 only in FIG. 8A). FIG. 8B illustrates the pay lines that are available in the middle sub-array 850 as exemplified by pay line 820. FIG. 8C shows the pay lines in the bottom sub-array 860 as exemplified by pay line 825. The pay lines lie in the individual sub-arrays. Thus, in the depicted embodiment, 3×5=15 pay arrangements are shown.

Figures 9A, 9B, 9C:
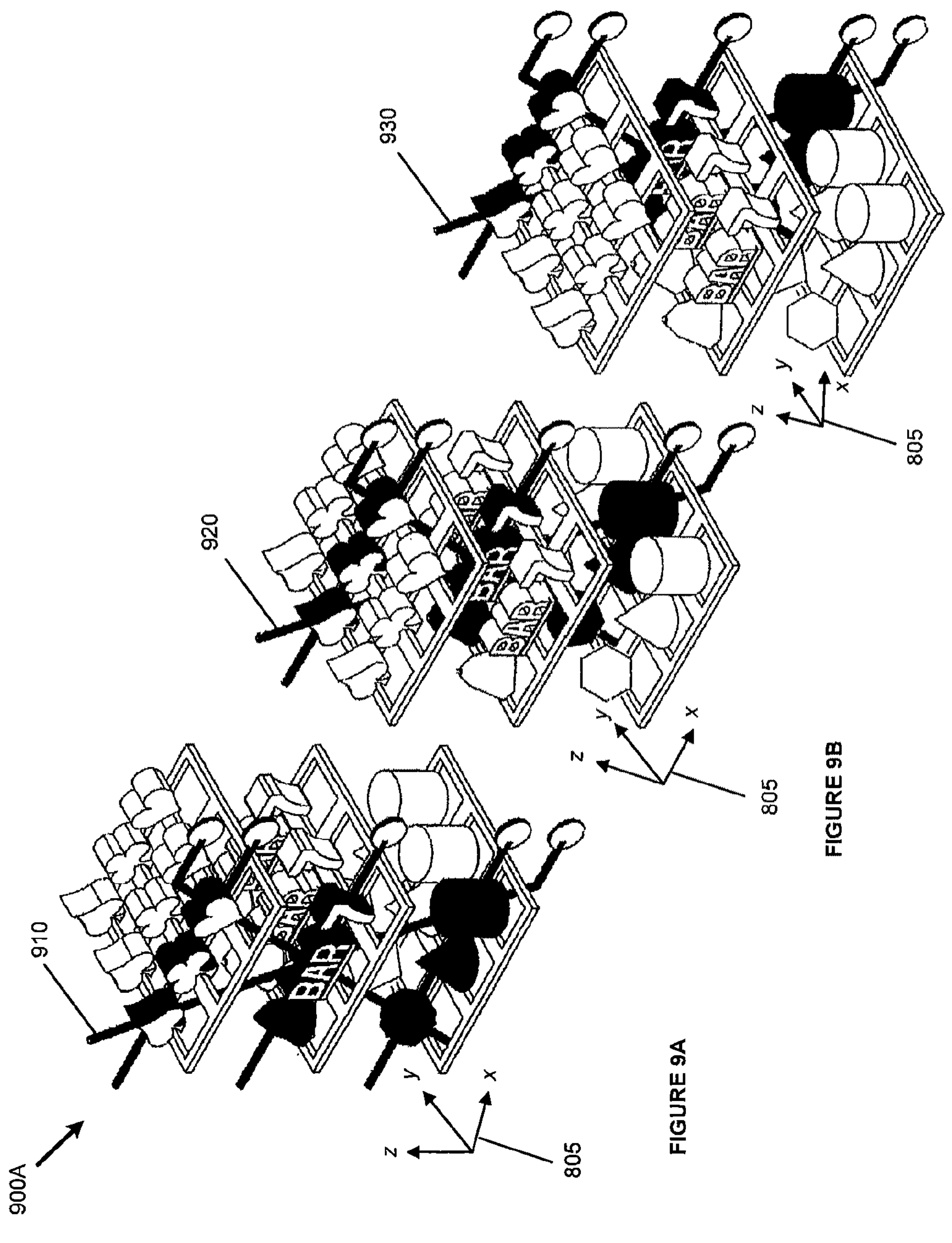
FIGS. 9A-9C show pay lines of the array of FIG. 8 which include symbols from two or more sub-arrays.
Figures 10A, 10B, 10C, 10D, 10E, 10F:
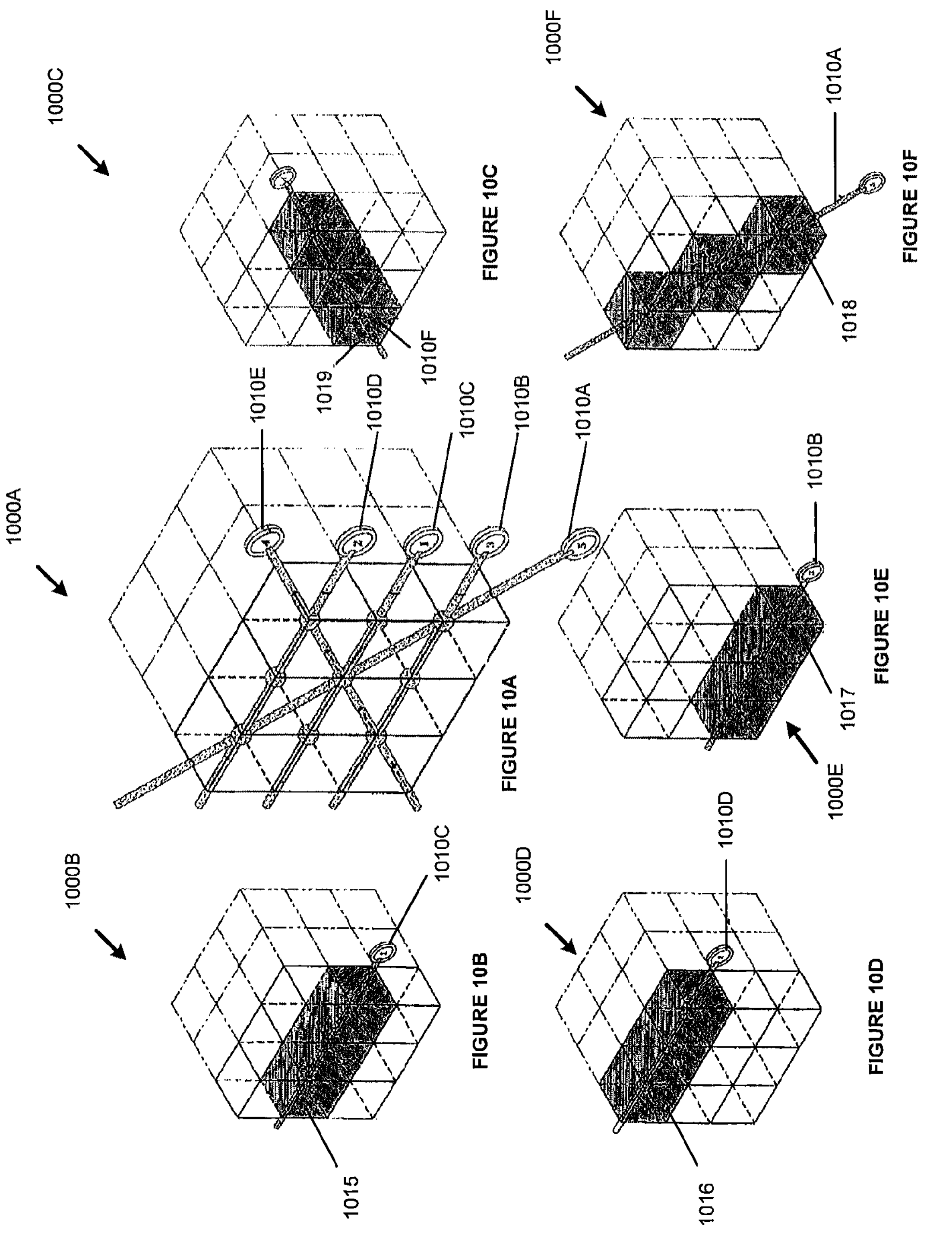
FIGS. 10A-10F, show an alternative representation of the three dimensional array and selected pay lines.

FIGS. 9A to 9C illustrate a like number of pay lines that pass through vertical planes 910, 920 and 930 respectively defined in the array 800A and which include symbols from tow or more, in this case all three, sub-arrays 840,850, 860. Thus the vertical arrangement of pay lines in FIGS. 9A-9C shows another 3×5=15 pay lines.

Persons skilled in the art will appreciate that other pay lines are possible, for example an additional pay line could extend diagonally so that it passes through each sub-array 840,850, 860 and each vertical plane. It is also possible to have pay lines that reflect through the three-dimensional array 800A to include symbols from different sub-arrays 840,850,860. However, it will be appreciated that irrespective of the embodiment, there will be pay lines in at least two different sub-arrays 840,850,860.

Persons skilled in the art will appreciate that it is not strictly necessary to employ both horizontal and vertical planes in the same embodiment, although it is advantageous to do so.

FIG. 10A to 10F illustrate that the pay lines can be represented in different ways in that the display positions can be different. It can be apparent from FIGS. 10A to 10F that the displays 1000A to 1000F can take the form of cubes rather than the open lattice type display of FIGS. 8 and 9. Win lines can extend through horizontal planes as indicated by win lines 1010A to 1010E and these planes can be transverse to one another as indicated by win line 1010F. Shading 1015 to 1019 can be used to highlight different pay lines.

Once the symbols have been displayed at all the relevant positions under control of a 3D display controller, the prize evaluator 622B determines whether the symbols in their symbol positions (given the win entitlement of the player) result in the awarding of any prize based on the prize data 641B. The prize evaluator 622B may compare the symbols selected and displayed in any arrangement selected by the player to be wagered upon. If the symbols for any wagered upon lines compares with a predetermined winning combination, the player is awarded a prize.

Various other embodiments will be apparent to persons skilled in the art, for example, the 3×3 array of FIGS. 8 to 10 can readily be extended to a 4×4 array. Further, while in the exemplary embodiment there are no purely vertical pay lines—i.e. which extend in a direction along the Z axis, vertical pay lines could be used in some embodiments. Further, the invention can be extended to rectangular prisms of display positions. For example, a 5×3×3 three-dimensional array.

Figure 7:
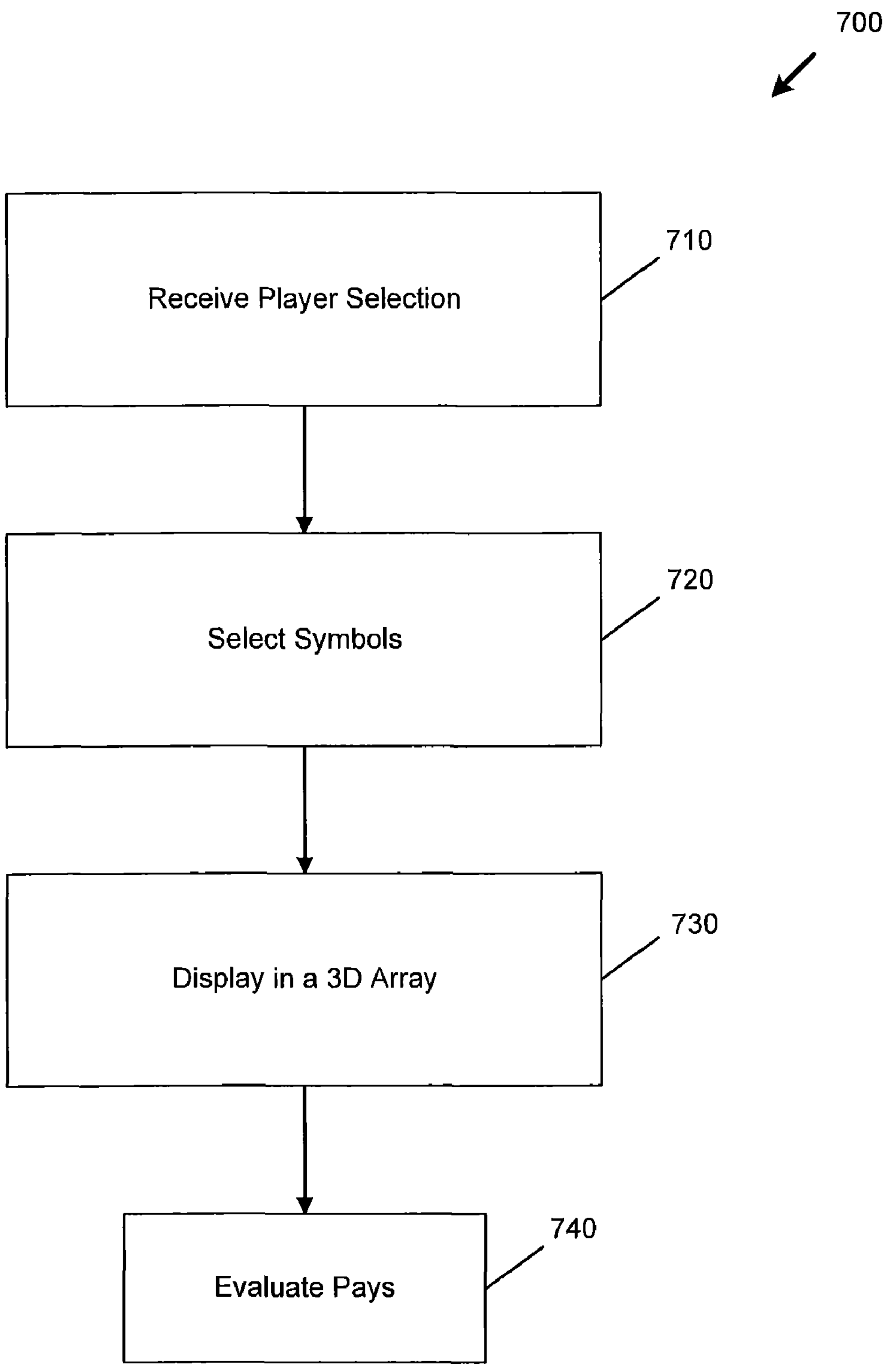
FIG. 7 is a flowchart of an embodiment.

The method of the invention is summarised as illustrated in FIG. 7 where a pay line selection is received 710, symbols are selected 720, they are displayed in a three dimensional array 730 and prizes are evaluated from the player's selection of pay lines and the symbol patterns on those pay lines.

In this respect, persons skilled in the art will appreciate the prize evaluation may be in accordance with techniques known in the art.

Persons skilled in the art will also appreciate that the bets may relate to the lines that are available.

It should also be noted that scatter pays may also result in an award if certain symbols should occur, for example, in any position in each of the sub-arrays 840,850,860.

Other features found in conventional gaming machines including feature trigger symbols and the like may be applied. Further, the size of the three dimensional array could vary during game play. For example, a player may initially start with a two dimensional array of symbols but acquire a second two dimensional array of symbols or have the symbols expanded to a 3×3 matrix in response to a trigger event occurring. Such a trigger event may be in accordance with techniques known in the art including the occurrence of a particular symbol in the base game, the payment of an additional bet or trigger based on turnover or games played.

Other variations will be apparent to persons skilled in the art. As but an example, symbols from one or several of the arrays may be used as substitute or additional symbols for a main game array to define additional winning outcomes. For example, the array 840 may represent a primary array. Symbols at corresponding locations in arrays 850 and/or 860 may be used to replace certain symbols at the primary array 840. For example, if either array 850 or 860 displays a wild symbol, that wild symbol may be displayed as migrating to the primary array 840 to define additional winning symbol arrangements. In this fashion the symbols at arrays 850 or 860 may be used to define multipliers or otherwise change the award as produced in the primary array 840.

Other variations would be apparent to persons skilled in the art and should be considered as falling within the scope of the invention described herein.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art in any other country.

The invention claimed is:

1. A method of gaming using a display, the method comprising:
- selecting a plurality of symbols;
- displaying the selected symbols on the display at respective ones of a plurality of display positions, said displaying including arranging said symbols into a plurality of sub-arrays that combine to form a three-dimensional array, said three-dimensional array being viewable on said display; and
- determining that a game outcome is a winning outcome when a predetermined subset of the selected symbols displayed in the plurality of sub-arrays forming the three-dimensional array corresponds with at least one of a plurality of predefined pay lines, at least two of the plurality of predefined pay lines being defined by display positions in different planes visually apparent to each other on the display.

2. A method as claimed in claim 1, further comprising receiving a player selection defining a player win entitlement; and wherein said determining includes basing a winning outcome on the player win entitlement.

3. A method as claimed in claim 2, wherein said receiving a player selection includes receiving a selection of at least one of a plurality of pay lines, each pay line comprising a different set of display positions, and wherein said determining includes basing a winning outcome on a selected pay line and selected symbols.

4. A method as claimed in claim 3, wherein the plurality of pay lines include pay lines in respective ones of a plurality of different parallel planes.

5. A method as claimed in claim 3, wherein at least two of the plurality of pay lines are in respective ones of a pair of transverse planes.

6. A method as claimed in claim 1, wherein the number of symbol positions is the same along at least two axes of the three-dimensional array.

7. A method as claimed in claim 6, wherein the number of symbol positions is the same along all three axes of the three-dimensional array.

8. A method as claimed in claim 7, wherein the three-dimensional array is a 3×3×3 array.

9. A method as claimed in claim 7, wherein the three-dimensional array is a 4×4×4 array.

10. A method as claimed in claim 6, wherein the number of symbol positions is the different along the third axis of the three-dimensional array.

11. A method as claimed in claim 10, wherein the three-dimensional array is a 5×3×3 array.

12. A method as claimed in claim 1, using a plurality of reels having symbols; and wherein said selecting a plurality of symbols comprises spinning the plurality of reels and randomly selecting stop positions for said plurality of reels.

13. A method as claimed in claim 12, wherein the number of the plurality of reels corresponds to the number of symbol positions in a plane parallel to two axes of the three-dimensional array.

14. A method according to claim 12, wherein said plurality of reels are virtual reels.

15. A method as claimed in claim 1, wherein each symbol is displayed as three-dimensional on the display.

16. A method as claimed in claim 1, using a game controller, and wherein generating a game outcome and determining whether the game outcome includes one or more winning outcomes are performed by the game controller.

17. A game controller for a gaming system having a display, the game controller arranged to:
- select a plurality of symbols,
- display the selected symbols on the display at respective ones of a plurality of display positions, the plurality of display positions being arranged into a plurality of sub-arrays that combine to form a three-dimensional array; and
- determine that a game outcome is a winning outcome when a predefined subset of the selected symbols displayed in the plurality of sub-arrays forming the three-dimensional array corresponds with at least one of a plurality of predefined pay lines, at least two of the plurality of predefined pay lines being defined by display positions in different planes visually apparent to each other on the display.

18. A game controller as claimed in claim 17, wherein the game controller is arranged to receive a player selection defining a player win entitlement; and wherein said game controller is arranged to base a winning outcome on the player win entitlement.

19. A game controller as claimed in claim 18, wherein the player selection comprises at least one of a plurality of pay lines, each pay line comprising a different set of the plurality of display positions, and wherein the game controller is arranged to base a winning outcome on a selected pay line and selected symbols.

20. A game controller as claimed in claim 19, wherein the plurality of pay lines include pay lines in respective ones of a plurality of different parallel planes.

21. A game controller as claimed in claim 19, wherein at least two of the plurality of pay lines are in respective ones of a pair of transverse planes.

22. A game controller as claimed in claim 17, wherein the number of symbol positions is the same along at least two axes of the three-dimensional array.

23. A game controller as claimed in claim 22, wherein the number of symbol positions is the same along all three axes of the three-dimensional array.

24. A game controller as claimed in claim 22, wherein the number of symbol positions is the different along the third axis of the three-dimensional array.

25. A game controller as claimed in claim 23, wherein the three-dimensional array is a 3×3×3 array.

26. A game controller as claimed in claim 23, wherein the three-dimensional array is a 4×4×4 array.

27. A game controller as claimed in claim 24, wherein the three-dimensional array is a 5×3×3 array.

28. A game controller for a gaming system as claimed in claim 17, wherein said gaming system has a plurality of reels having symbols; and wherein the game controller is arranged to spin the plurality of reels and to randomly select stop positions for the plurality of reels.

29. A game controller as claimed in claim 28, wherein the number of the plurality of reels corresponds to the number of symbol positions in a plane parallel to two axes of the three-dimensional array.

30. A game controller as claimed in claim 17, further including a processor, a memory and program code stored in the memory.

31. A gaming system comprising:

a player interface comprising a video display and a game instruction input mechanism manually operable to receive a selection specifying a win entitlement; and a game controller arranged to:

select a plurality of symbols, display the selected symbols on the display at respective ones of a plurality of display positions, the plurality of display positions being arranged into a plurality of sub-arrays that combine to form a three-dimensional array; and determine that a game outcome is a winning outcome when a predefined subset of the selected symbols displayed in the plurality of sub-arrays forming the three-dimensional array corresponds with at least one of a plurality of predefined pay lines, at least two of the plurality of predefined pay lines being defined by display positions in different planes visually apparent to each other on the display.

32. A gaming system as claimed in claim 31, wherein said game controller includes a memory, a processor and game program code stored in the memory.

33. A gaming system as claimed in claim 32, wherein the memory stores data representing the plurality of symbols.

34. A gaming system as claimed in claim 31, wherein the instruction input mechanism is operable to receive a wager in respect of the selection.

35. A gaming system as claimed in claim 31, wherein the instruction input mechanism is operable to receive a selection of at least one of a plurality of pay lines, each pay line comprising a different set of the plurality of display positions, and wherein said game controller is arranged to base a winning outcome on a selected pay line and selected symbols.

36. A gaming system as claimed in claim 35, wherein the plurality of pay lines include pay lines in respective ones of a plurality of different parallel planes.

37. A gaming system as claimed in claim 35, wherein at least two of the plurality of pay lines are in respective ones of a pair of transverse planes.

38. A gaming system as claimed in claim 31, wherein the number of symbol positions is the same along at least two axes of the three-dimensional array.

39. A gaming system as claimed in claim 38, wherein the number of symbol positions is the same along all three axes of the three-dimensional array.

40. A gaming system as claimed in claim 38, wherein the number of symbol positions is the different along the third axis of the three-dimensional array.

41. A gaming system as claimed in claim 39, wherein the three-dimensional array is a 3×3×3 array.

42. A gaming system as claimed in claim 39, wherein the three-dimensional array is a 4×4×4 array.

43. A gaming system as claimed in claim 40, wherein the three-dimensional array is a 5×3×3 array.

44. A gaming system as claimed in claim 43, further comprising a plurality of reels having symbols; and wherein the game controller is arranged to spin the plurality of reels and randomly select stop positions for the plurality of reels.

45. A gaming system as claimed in claim 44, wherein the number of the plurality of reels corresponds to the number of symbol positions in a plane parallel to two axes of the three-dimensional array.

46. A gaming system as claimed in claim 31, wherein each symbol is displayed as three-dimensional on the display.

* * * * *

UNITED STATES PATENT AND TRADEMARK OFFICE

CERTIFICATE OF CORRECTION

PATENT NO. : 8,360,861 B2
APPLICATION NO. : 12/324524
DATED : January 29, 2013
INVENTOR(S) : McKay et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 643 days.

Signed and Sealed this
Eighteenth Day of November, 2014

Michelle K. Lee
*Deputy Director of the United States Patent and Trademark Office*